(12) United States Patent
Kim et al.

(10) Patent No.: US 6,470,001 B1
(45) Date of Patent: Oct. 22, 2002

(54) DEVICE AND METHOD FOR TIME ALIGNMENT ON REVERSE LINK IN MOBILE COMMUNICATION SYSTEM

(75) Inventors: Young-Ky Kim, Seoul (KR); Soon-Young Yoon, Seoul (KR); Jae-Min Ahn, Seoul (KR); Hee-Won Kang, Seoul (KR); Jin-Woo Choi, Songnam-shi (JP)

(73) Assignee: Samsung Electronics, Co., Ltd. (KR)

( * ) Notice: Subject to any disclaimer, the term of this patent is extended or adjusted under 35 U.S.C. 154(b) by 0 days.

(21) Appl. No.: 09/250,704

(22) Filed: Feb. 16, 1999

(51) Int. Cl.[7] .............................................. H04B 7/216
(52) U.S. Cl. ........................ 370/342; 370/516; 370/519
(58) Field of Search ................................. 370/342, 320, 370/324, 329, 332, 333, 335, 341, 277, 352, 353, 354, 360, 401, 438, 439, 441, 508, 514, 516, 517, 519, 522, 521, 326, 350, 500, 503

(56) References Cited

U.S. PATENT DOCUMENTS

| | | | | |
|---|---|---|---|---|
| 5,838,669 A | * | 11/1998 | Gerakoulis | 370/320 |
| 5,872,774 A | * | 2/1999 | Wheatley, III et al. | 370/335 |
| 5,887,262 A | * | 3/1999 | Willhoff | 455/452 |
| 5,920,551 A | * | 7/1999 | Na et al. | 370/335 |
| 5,946,356 A | * | 8/1999 | Felix et al. | 375/295 |
| 5,987,316 A | * | 11/1999 | Gordon et al. | 455/411 |
| 6,094,421 A | * | 7/2000 | Scott | 370/280 |
| 6,097,715 A | * | 8/2000 | Ichihara | 370/342 |

* cited by examiner

Primary Examiner—Dang Ton
Assistant Examiner—Phirin Sam
(74) Attorney, Agent, or Firm—Dilworth & Barrese, LLP

(57) ABSTRACT

A device for time alignment on a reverse link in a CDMA mobile communication system. A base station stores a reference sync channel RTD (Round Trip Delay), calculates the difference between the reference sync channel RTD and a measured sync channel RTD, and outputs a time alignment control signal on a forward control channel when the calculated RTD error exceeds a predetermined value, during a data communication. A terminal receives the time alignment control signal on the forward control channel and time aligns a reverse traffic channel based on the received time alignment control signal.

11 Claims, 10 Drawing Sheets

DEVICE AND METHOD FOR TIME ALIGNMENT ON REVERSE LINK IN MOBILE COMMUNICATION SYSTEM

BACKGROUND OF THE INVENTION

1. Field of the Invention

The present invention relates generally to communication systems, and more particularly, to an apparatus for time-aligning signals on a reverse link in code division multiple access (CDMA) communication systems.

2. Description of the Related Art

In a CDMA system, each user transmits in the same RF band. To avoid mutual interference, different code sequences are used to identify and distinguish users. These user code sequences are generally divided into orthogonal code sequences and non-orthogonal code sequences.

Typically the use of non-orthogonal codes as a user identifying code involves assigning different seed numbers to users and then processing PN (Pseudo Noise) sequences with the seed numbers. Due to the non-orthogonality of such codes, user signals suffer from interference from other user signals, making signal separation to be less than ideal. Orthogonal functions improve the bandwidth efficiency of a CDMA system. While there are many different code sequences that can be used to generate an orthogonal set of functions, the Walsh and Hadamard sequences are among the most popular for CDMA. Walsh codes, for example, are characterized by no interference among users in the same cell only if time alignment is ensured, thus enabling user signals to be separated from one another. Without time alignment, if a multipath causes a delay of one of the user's codes by one chip, for example, then the delayed code may no longer be orthogonal to the other non-delayed codes in the code set. Therefore, time alignment is essential when using Walsh or Hadamard codes for DS-SS multiple access. In practice, the IS-95 CDMA system uses a pilot channel and a sync channel to time align (i.e., synchronize) the forward link and to ensure that the link is coherent.

CDMA mobile communication systems employ both orthogonal and non-orthogonal code sequences for forward and reverse links. The forward link is typically orthogonally coded because a base station simultaneously generates signals to a number of user terminals. Currently, Walsh codes are used only on the forward link. Non-orthogonal code sequences are typically used on the reverse link. The base station receives non-time aligned signals from the terminals, which makes it difficult to use orthogonal codes for user identification.

A time alignment method for synchronous reception of signals in a base station of a CDMA mobile communication system is disclosed in U.S. Pat. No. 5,446,727, to Bruckert et al. ("the '727 patent"). The '727 patent discloses that time alignment of reverse link transmission may be achieved by designating a time position in the strongest signal path as that of a multipath signal received from a terminal or computing an average arrival time from arrival times of signals from different paths as the time position of a multipath signal, and then periodically transmitting a time alignment signal to a terminal, However, the method disclosed in the '727 patent relies on measuring the strength of an occupied channel and may be inaccurate by not being properly time aligned. Also, a time alignment signal should be sent on the occupied channel for control of time alignment.

Periodic transmission of a time alignment signal from a base station to a terminal in a conventional CDMA mobile communication system is not effective for certain situations for terminals which are relatively slow and thus show little variation in channel status. Another associated problem is that limitations exist in managing a possible sudden change of channel status in terminals. A need therefore exists for a method and apparatus for time alignment of a reverse link transmission during data transmission.

SUMMARY OF THE INVENTION

An object of the present invention is, therefore, to provide a method and apparatus for time alignment of a reverse link transmission in a CDMA mobile communication system.

Another object of the present invention is to provide a method and an apparatus for time alignment of a reverse link transmission in a base station of a CDMA mobile communication system.

A further object of the present invention is to provide a method and an apparatus for time alignment of a reverse link transmission in a CDMA mobile communication system, in which a base station transmits a time alignment signal on a dedicated control channel (DCCH) and a mobile terminal time-aligns (i.e., in communication) occupied reverse channels based on the time alignment signal.

Still another object of the present invention is to provide a method and an apparatus for time alignment of a reverse link transmission in a CDMA mobile communication system, in which time alignment is executed on a predetermined reverse channel among several reverse channels in current use.

To achieve the above objects, there is provided a method and apparatus for time alignment on a reverse link in a CDMA mobile communication system; the system comprising a base station having a reference sync channel with a round trip delay (RTD) time. The method comprises the step of calculating an RTD error value as the difference between a reference sync channel RTD and a sync channel RTD, and outputting a time alignment control signal on a forward control channel if the computed RTD error exceeds a predetermined value during a data communication. A terminal receives the time alignment control signal on a forward control channel and time aligns a reverse traffic channel based on the received time alignment control signal.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
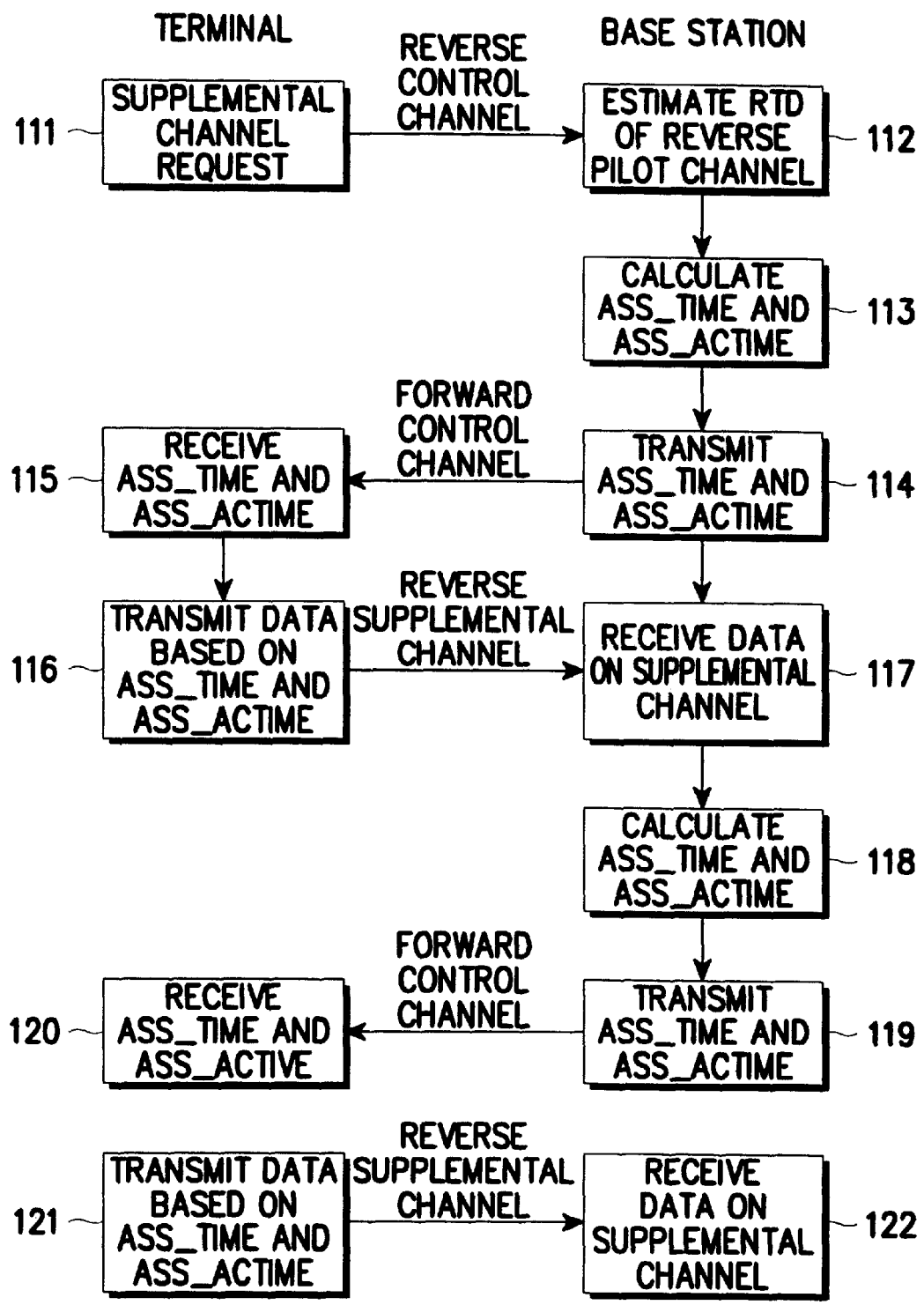
FIG. 1 is a block diagram of time aligning data transmission on a reverse link in a CDMA mobile communication system according to an embodiment of the present invention.

The present invention provides a method of time aligning a reverse link transmission. In particular, the method describes the time alignment of a specific channel among several channels in current use. The method uses orthogonal codes on a reverse link for both user identification and to improve the performance of the reverse link. Overhead is minimized by time aligning reverse channels using a control message via a dedicated control channel (DCCH) without modifying the structure of the existing CDMA mobile communication system. While it is preferable to execute time alignment on all reverse channels such a situation is impractical in that there is an insufficient number of orthogonal codes to do so. Further when a terminal occupies several channels, the problem of an insufficient number of orthogonal codes becomes magnified. Therefore, it becomes practical to time align only the channel which is assigned the highest power among all reverse channels. If orthogonal code shortage was not a limiting factor, all channels would preferably be time aligned in the same manner as that of a single channel.

In accordance with the method of the present invention, a determination is made concerning whether a signal transmitted from a mobile terminal is time-aligned by using information derived from a sync channel instead of an occupied communication channel. Further, the method utilizes a dedicated control channel (DCCH) to allow a base station to transmit a time alignment signal to a mobile terminal when necessary. From a performance standpoint, when time alignment on a reverse traffic channel is performed, it should preferably include a fundamental channel (i.e., voice traffic channel) and a supplemental channel (i.e, packet traffic channel). However, due to the practical limitation of a fixed number of available orthogonal codes, as described above, time alignment is applied to only those channels requiring the largest channel capacity after the base station and the terminal notify each other of an intended communication via a dedicated control channel DCCH. It is important to note that, according to the present invention, a reverse pilot channel is preferably designated as a sync channel determining time alignment, and a supplemental channel is preferably designated to be the predetermined channel to be time aligned.

In each of the embodiments described herein, sync channels are exclusively used to estimate the time positions of reverse traffic channels during both the initialization period and as traffic data is transmitted and received. Further, a time alignment signal is immediately transmitted to a terminal having an estimated time position in excess of a predetermined error threshold. That is, time alignment is not performed periodically, but rather, occurs whenever the threshold is exceeded. In addition, the time alignment method of the present invention may be used in combination with a system in which a time alignment signal is periodically transmitted regardless of terminal status.

FIG. 1 is a block diagram showing the control of a time alignment procedure on a reverse link during a communication between a base station and a mobile terminal. As the mobile terminal transmits data on an assigned reverse traffic channel, the base station analyzes the time position of a reverse sync channel, using the time position information to time align the reverse traffic channel.

Referring to FIG. 1, the terminal transmits a traffic channel request, that is, a supplemental channel request to the base station via a reverse dedicated control channel (DCCH), for data communication, in step 111. Upon reception of the request for a supplemental channel, the base station sends the terminal a control message for assigning an available reverse supplemental channel via a forward DCCH. Upon receiving the control message the terminal transmits data via the newly assigned reverse supplemental channel.

During the data communication, the base station estimates the estimated RTD of the newly assigned reverse supplemental channel from the sync channel, (i.e., the reverse pilot channel) in step 112. If the difference between the estimated RTD and a reference RTD exceeds a predetermined error limit, the base station calculates a time alignment parameter and an action time parameter for time alignment of data, in step 113. Then, the base station sends a control message representative of the calculated time alignment and action time parameters to the terminal via a forward DCCH, in step 114. Upon receipt of the control message by the terminal in step 115, the terminal transmits data on the reverse supplemental channel with time alignment based on the parameters sent by the base station, in step 116.

By time aligning the reverse supplemental channel, the base station can synchronously receive data from a plurality of terminals on reverse supplemental channels within the predetermined error limit. The procedure of aligning the time position of a reverse supplemental channel based on a sync channel (i.e., the reverse pilot channel) is repeated in steps 117 to 122 as long as data is communicated between the base station and the terminal.

Figure 2:
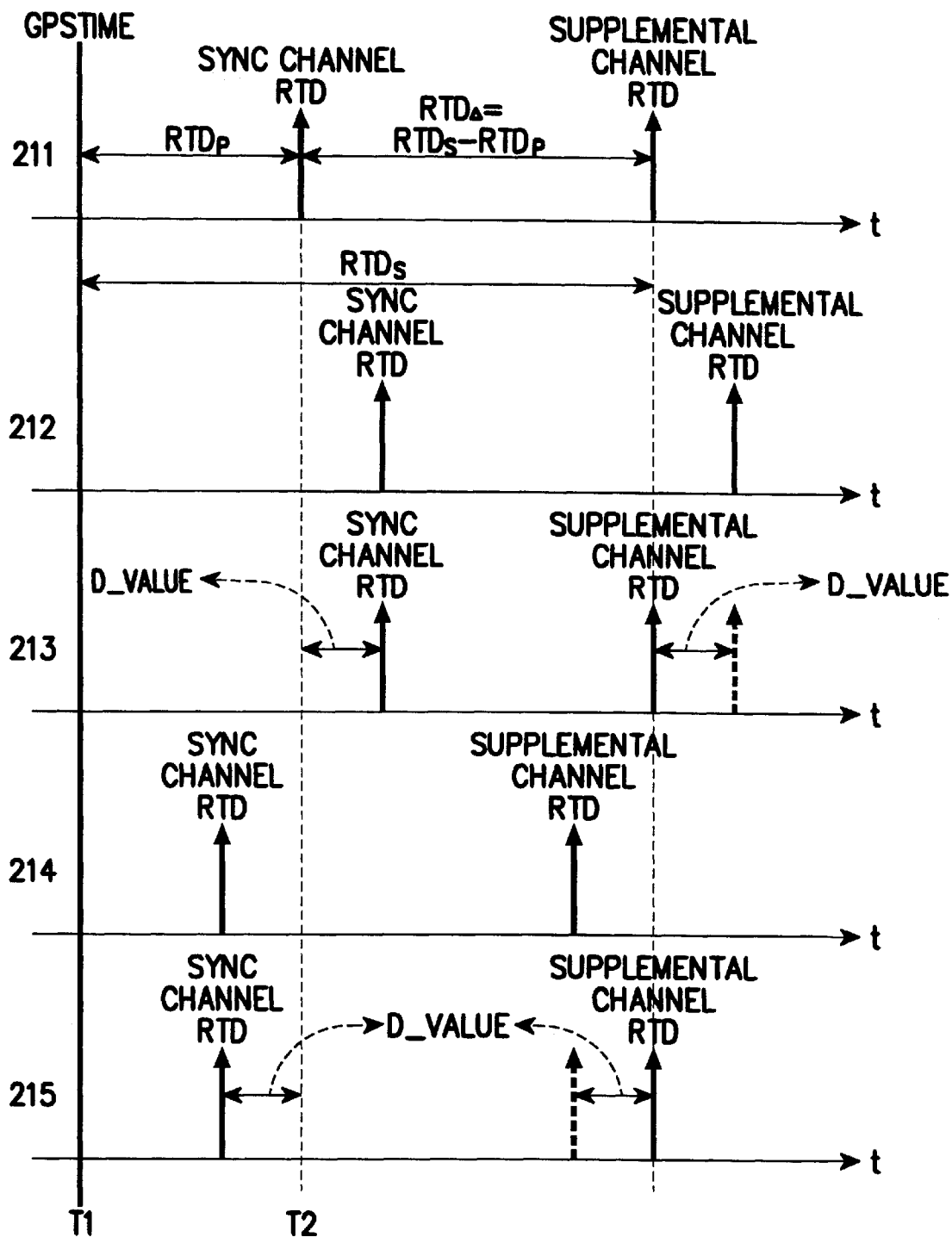
FIG. 2 is a conceptual view of time aligning traffic channel data on a reverse link using a sync channel in the CDMA mobile communication system according to an embodiment of the present invention.

FIG. 2 generally depicts a time line for performing time alignment of a reverse supplemental channel in a terminal upon receipt of a time alignment command from a base station.

Reference numeral 211 indicates a reference RTD ($RTD_P$) for a sync channel and a reference RTD ($RTD_S$) for a supplemental channel. An absolute reference time T1 is also provided as a GPS (Global Positioning System) time. The sync channel signal should ideally arrive at the base station at a reference time T2, where T2 is the sync channel reference RTD delayed from the GPS absolute reference time (Ti) by a predetermined time $RTD_P$. A supplemental channel RTD is delayed from the GPS time by a predetermined time $RTD_S=RTD_P+RTD\Delta$. It should be noted that while the supplemental channel RTD is expressed partially in terms of the sync channel delay, the respective delays are independent. Further, the difference between the supplemental channel RTD and the sync channel RTD is a constant and may be set to be zero. In operation, the difference between the actual sync channel RTD and the reference sync channel $RTD_P$ is calculated, and the difference is used to estimate the supplemental channel RTD from which time alignment is performed on the reverse link.

Reference numerals 212 and 214 of FIG. 2 denote sync channel RTDs varied shortly after system acquisition and before time alignment. Performance number 212 illustrates the situation where the sync channel RTD is delayed from and earlier than the reference sync channel RTD. Reference numeral 214 illustrates the situation where the sync channel RTD is delayed from and later than the reference sync channel RTD. If the difference between the sync channel RTD and the reference sync channel RTD exceeds a predetermined value, time alignment should be performed.

In the general case, without time alignment on the reverse supplemental channel, a supplemental channel signal arrives at the base station at a different time from that of another user. Data transmission spread by orthogonal codes without time alignment on the reverse link leads to a loss of orthogonality in the base station and interference occurs as an undesirable consequence. As a result, the advantages of spreading a data transmission via orthogonal codes is reduced.

Reference numerals 213 and 215 of FIG. 2 denote time aligned reverse supplemental channels associated with non-time aligned reverse channels 212 and 214, respectively. Since the actual sync channel RTD varies with the channel environment, time alignment can be achieved by delaying or advancing of the supplemental channel rather than varying the sync channel RTD. For this purpose, the base station calculates a time alignment value for the supplemental channel based on the sync channel RTD and transmits time alignment parameters to the terminal on a forward DCCH. Then, the terminal, in response to receiving the time alignment parameters, time aligns the reverse supplemental channel based on the received parameters, as indicated by 214.

Figure 3:
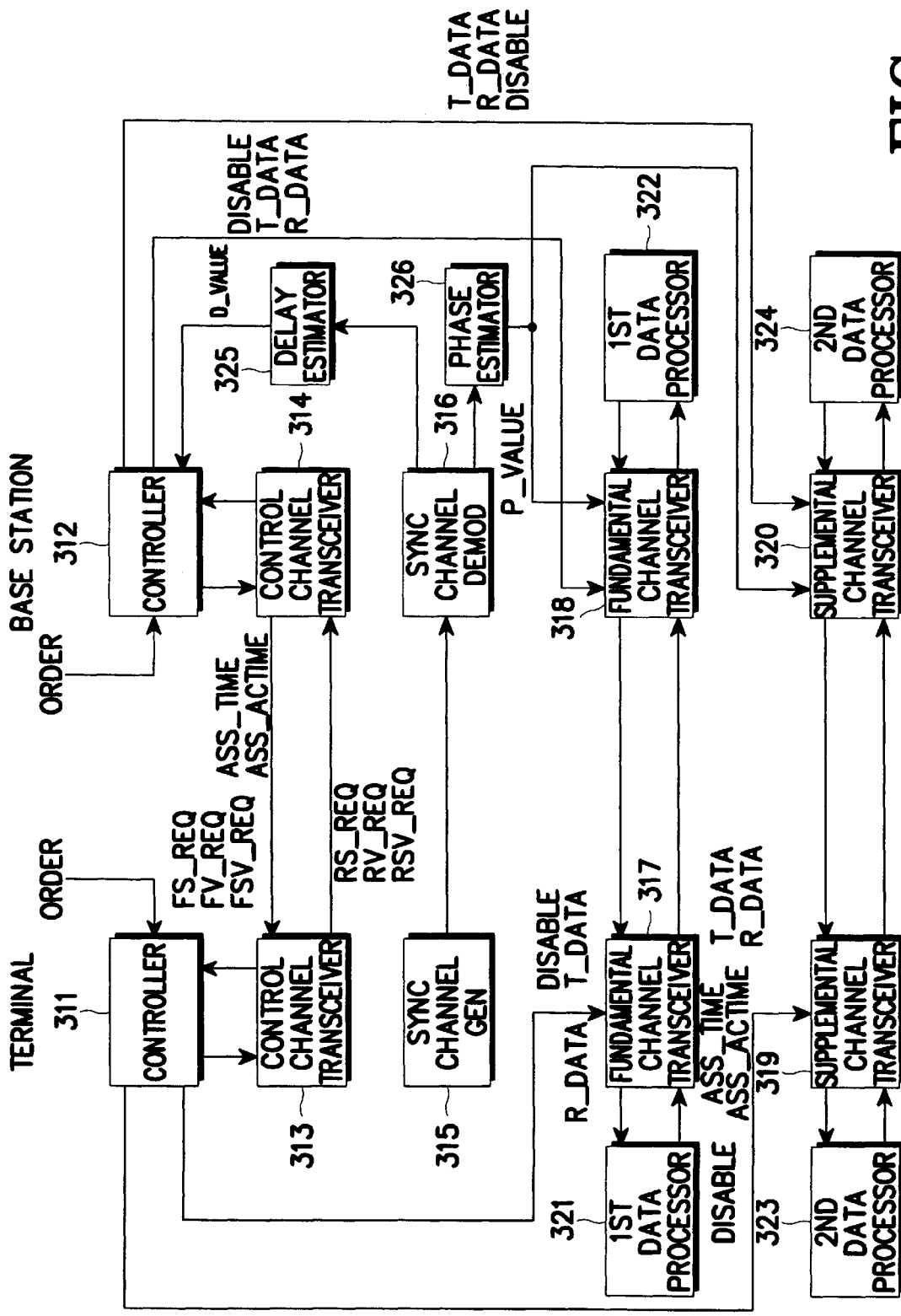
FIG. 3 is a block diagram of a device for time alignment of a reverse link transmission in the CDMA mobile communication system according to an embodiment of the present invention.

FIG. 3 is a block diagram of a CDMA mobile communication system for describing a time alignment operation on a reverse link, including a control channel, a sync channel, a fundamental channel, and a supplemental channel.

Referring to FIG. 3, a terminal control channel transceiver 313 receives a control message from a terminal controller 311 and transmits the control message. The control channel transceiver 313 also passes a control message received on a forward channel to the terminal controller 311.

A terminal sync channel generator 315 transmits a reverse sync channel signal to a base station sync channel demodulator 316. The reverse sync channel signal is used by the base station to estimate a time alignment error of a reverse supplemental channel. The reverse sync channel is preferably implemented as a pilot channel.

A fundamental channel transceiver 317 of the terminal transmits data on a reverse fundamental channel and receives data on a forward fundamental channel, under the control of a transmission/reception control signal generated from the controller 311. The fundamental channel transceiver 317 interfaces with a first data processor 321, for processing transceived data. The fundamental channel can be voice data.

A supplemental channel transceiver 319 of the terminal transmits data on a reverse supplemental channel and receives data on a forward supplemental channel, under the control of a transmission/reception control signal generated from the controller 311. The supplemental channel transceiver 317 interfaces with a second data processor 323, for processing the transceived data. The supplemental channel data can be packet data. In accordance with the present invention, the reverse supplemental channel is subject to time alignment. Thus, the supplemental channel transceiver 319 receives a time alignment parameter and an action time parameter from the controller 311 and transmits data to a supplemental channel transceiver 320 of the base station based on the time alignment and action time parameters.

The controller 311 of the terminal receives a signal ORDER from an upper-level system. The controller 311 also sends the base station a signal RS_REQ when requesting only a reverse supplemental channel, (i.e., voice only) a signal RV_REQ when requesting only a reverse fundamental channel, and a signal RSV_EQ for simultaneously requesting a reverse supplemental channel and a reverse fundamental channel. Further, It receives control messages from the base station on a forward control channel to perform a control operation. That is, the controller 311 receives from the base station a signal FS-REQ for requesting a forward supplemental channel, a signal FV_REQ for requesting a forward fundamental channel, and a signal FSV_REQ for simultaneously requesting forward supplemental and fundamental channels.

The controller 311 of the terminal sends the fundamental channel transceiver 317 a data transmit command signal T_DATA, a data receive command signal R_DATA, and an action stop command signal DISABLE. It is important to note that the fundamental channel transceiver does not perform time alignment. The controller 311 sends the supplemental channel transceiver 319 a time alignment parameter ASS_TIME and an action time parameter ASS_ACTIME when performing time alignment as well as the data transmit command signal T_DATA, the data receive command signal R_DATA, and the action stop command signal DISABLE.

With respect to the base station, a control channel transceiver 314, a fundamental channel transceiver 318, and a supplemental channel transceiver 320 of the base station correspond to their counterparts of the terminal in configuration and operation.

The sync channel demodulator 316 of the base station receives reverse sync channel data from the sync channel generator 315 of the terminal and demodulates the received data.

A delay estimator 325 of the base station obtains the difference between the a sync channel RTD and a reference sync channel RTD from the sync channel data received from the sync channel demodulator 316 and feeds the difference to the controller 312.

A phase estimator 326 of the base station, which is generally used in digital communication, estimates the phase of the sync channel data received from the sync channel demodulator 316 and sends a phase delay parameter P_VALUE to the fundamental channel transceiver 318 and the supplemental channel transceiver 320.

In terms of function, the controller 312 of the base station is similar to the controller 311 of the terminal. The base station controller 312 receives a signal ORDER from an upper-level system and transmits/receives channel requests to/from the terminal through the base station control channel transceiver 314. Also, the base station controller 312 receives the estimated delay parameter D_VALUE from the base station delay estimator 325, and generates D_VALUE as the time alignment parameter ASS_TIME if D_VALUE exceeds a predetermined error limit. The terminal receives the time alignment command and sets its application time with respect to the GPS time as a standard time. The base station controller 312 sends the terminal the time alignment parameter ASS_TIME and the action time parameter ASS_ACTIME on a forward control channel.

The base station controller 312 sends the base station fundamental channel transceiver 318, the base station supplemental channel transceiver 320, the data transmit command signal T_DATA, the data receive command signal R_DATA, and the action stop command signal DISABLE. It further sends the time alignment parameter ASS_TIME and the action time parameter ASS_ACTIME to the supplemental channel transceiver 320 which performs time alignment.

Prior to describing the communication between the terminal and the base station on supplemental channels, key terms used herein are listed as follows.

TABLE 1

| Term | Definition | Term | Definition |
|---|---|---|---|
| FS_REQ | request for forward supplemental channel | ASS_TIME | time alignment parameter |
| RS_REQ | request for reverse supplemental channel | ASS_ACTIME | action time parameter |
| FV_REQ | request for forward fundamental channel | D_VALUE | RTD error |
| RV_REQ | request for reverse fundamental channel | P_VALUE | phase delay |
| FSV_REQ | request for forward fundamental and supplemental channels | T_DATA | data transmit command |
| RSV_REQ | request for reverse fundamental and supplemental channels | R_DATA | data receive command |
|  |  | DISABLE | action stop command |

Referring to FIG. 3 and Table 1, to communicate data from the terminal to the base station on a reverse supplemental channel, the terminal controls the control channel transceiver 313 to send the signal RS-REQ to the base station on a reverse control channel. Upon reception of the signal RS-REQ, the base station obtains the RTD error D-VALUE and the phase delay parameter P_VALUE from a signal output from the sync channel demodulator 316 through the delay estimator 325 and the phase estimator 326, and applies D_VALUE to the controller 312 and P_VALUE to the supplemental channel transceiver 320. The base station transmits R_DATA to the supplemental channel transceiver 320 and DISABLE to the fundamental channel transceiver 318 since a supplemental channel alone is used.

The controller 312 of the base station sends the controller 311 of the terminal the time alignment parameter ASS_TIME and the action time parameter ASS-ACTIME through the control channel transceiver 314. The controller 311 in the terminal sends the parameters ASS-TIME & ASS-ACTIME and the data transmit command signal T_DATA for the reverse link to the supplemental channel transceiver 319, and DISABLE to the fundamental channel transceiver 317 since only the supplemental channels are used. Then, the supplemental channel transceiver 319 transmits data with a time alignment based on the parameters.

Even while data is being communicated between the terminal and the base station, the base station continuously calculates the RTD error and phase shift of a sync channel signal received from the sync channel demodulator 316 and compares them with the previously assigned parameters. If the RTD error exceeds a predetermined value, the controller 312 sends the controller 311 of the terminal a current time alignment parameter ASS_TIME and a current action time parameter ASS_ACTIME through the control channel transceiver 314. The parameters ASS_TIME and ASS_ACTIME are also sent to the supplemental channel transceiver 320. The RTD of a signal from any terminal can be adjusted to a reference RTD in this manner.

Communication on a forward supplemental channel is the same as communication on a reverse supplemental channel, except that time alignment is not required on the forward supplemental channel since the base station already sends time-aligned signals to terminals.

For communication on a reverse fundamental channel from the terminal to the base station, the terminal sends the signal RV_REQ to the controller 312 of the base station via the control channel transceiver 313. The controller 311 of the terminal sends the signal T_DATA to the fundamental channel transceiver 317 and DISABLE to the supplemental channel transceiver 319. Upon reception of the signal RV_REQ, the controller 312 of the base station sends the signal R_DATA to the fundamental channel transceiver 318 and DISABLE to the supplemental channel transceiver 320.

Communication on a forward fundamental channel is the same as communication on a reverse fundamental channel, except for direction. With respect to communication from the terminal to the base station, including a reverse fundamental channel and reverse supplemental channel, time alignment is confined to the reverse supplemental channel. Communication on both forward fundamental and forward supplemental channels is the same as the reverse link, except for direction without the need for time alignment.

Figure 4:
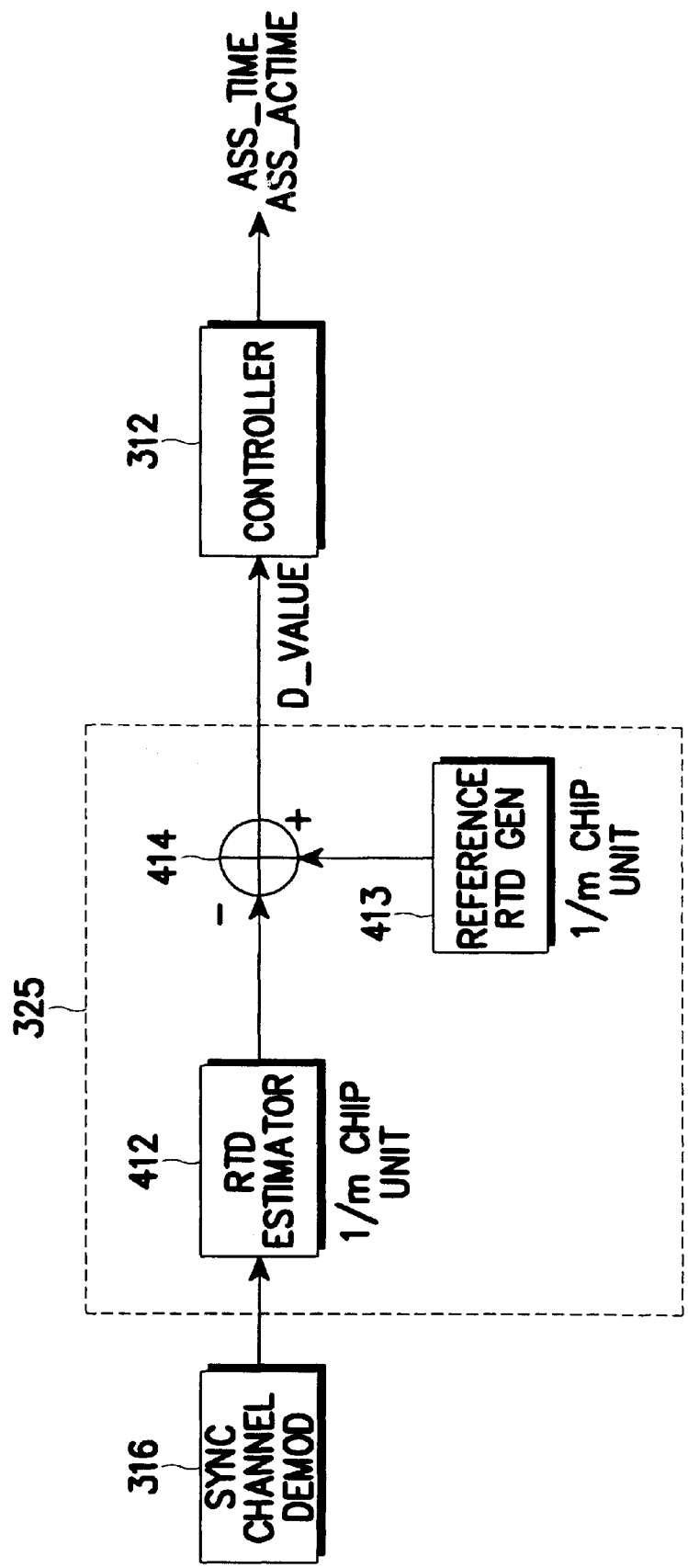
FIG. 4 is a block diagram of a delay estimator shown in FIG. 3.

FIG. 4 is a detailed block diagram of the delay estimator 325 shown in FIG. 3. An RTD estimator 412 estimates a sync channel RTD in 1/m chip units from a signal channel signal received from the sync channel demodulator 316. A reference RTD generator 413 stores a system-desired RTD value for each terminal. A subtractor 414 obtains the difference between the outputs of the RTD estimator 412 and the reference RTD generator 413, and outputs the difference as the RTD error D_VALUE.

If the RTD error D-VALUE received from the delay estimator 325 exceeds a predetermined value, the base station controller 312 generates the time alignment signal ASS_TIME and the action time signal ASS_ACTIME. More specifically, the base station delay estimator 325 estimates a sync channel RTD in ¼ chip units from a signal received from the base station sync channel demodulator 316. The reference RTD generator 413 stores a reference RTD for time synchronization to the system. The subtractor 414 calculates the difference between the reference RTD, stored by the base station, and the estimated sync channel RTD as an RTD error D_VALUE to be provided to the controller 312. If the computed RTD error value, D_VALUE exceeds a predetermined value, the base station controller 312 sends the terminal a time alignment parameter ASS_TIME, corresponding to the RTD error D_VALUE, and an action time parameter ASS_ACTIME indicative of a GPS-based time point to execute a time alignment as shown in FIG. 2. Upon reception of the parameters, the terminal executes the time alignment upon notification by the base station.

Figure 5:
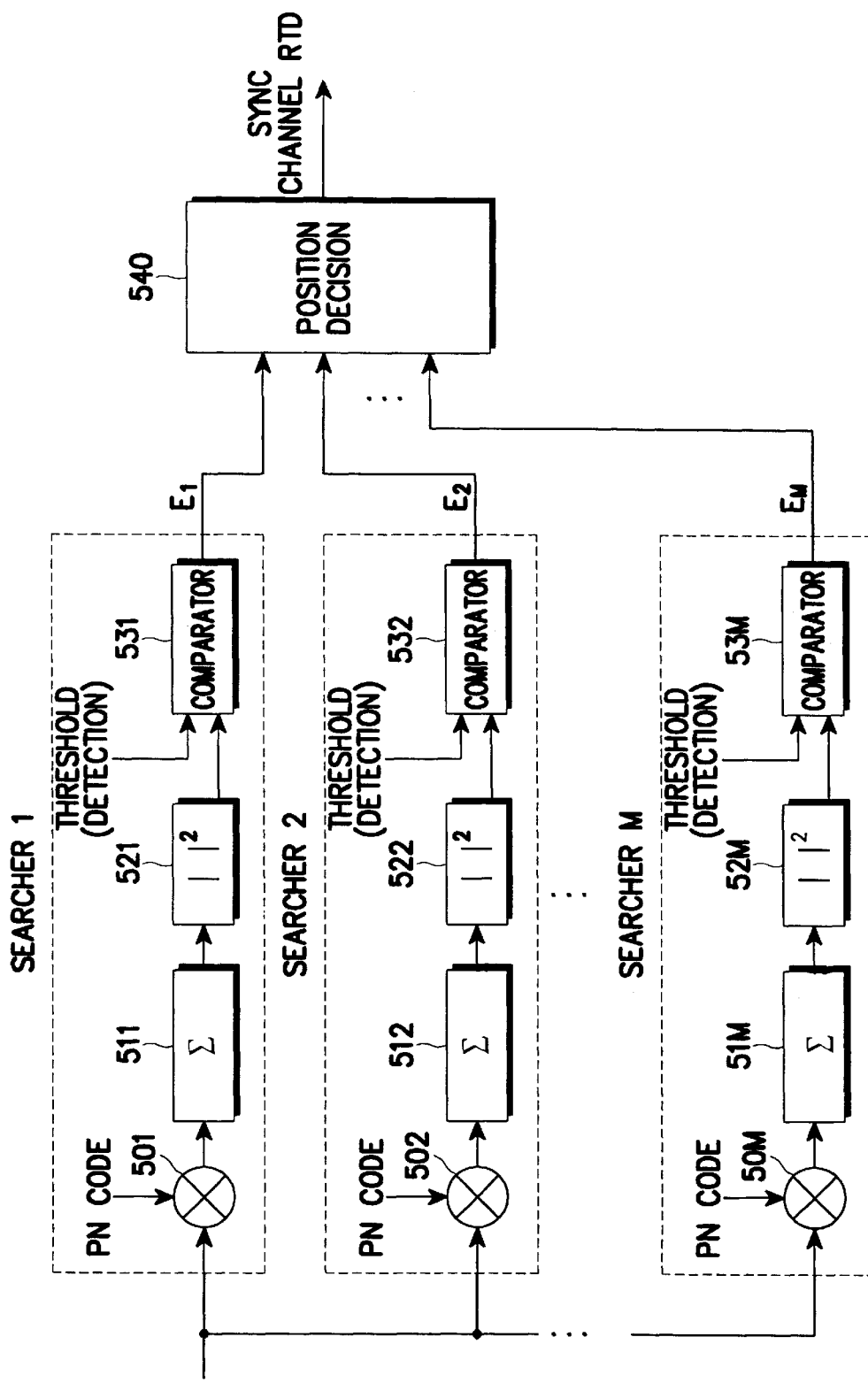
FIG. 5 is a block diagram of an RTD estimator shown in FIG. 4.

FIG. 5 is a detailed block diagram of the RTD estimator 412 in the delay estimator 325 of FIG. 4. Referring to FIG. 5, multipliers 501–50M despread a signal received from the sync channel demodulator 316. Correlators 511–51M detect correlation values from the outputs of their corresponding multipliers 501–50M with respect to a PN code 1–M available in the mobile communication system. Here, each branch is identically constructed the same as the others, except for a PN code. Squarers 521–52M square the correlation values received from their corresponding correlators 511–51M. Accumulators 511–51M accumulate the outputs of their corresponding multipliers 501–50M. Here, each branch is the same as the others, except for a PN code. Squarers 521–52M square the accumulated values received from their corresponding accumulators 511–51M. Comparators 531–53M receive two inputs, a threshold detection input and the output of an associated squarer. The comparator outputs the squarer input if it is larger than the corresponding threshold or zero if it is equal to or smaller than the threshold. A position decision block 540 estimates a current sync channel RTD from the comparison results received from the comparators 531–53M.

Figure 6A:
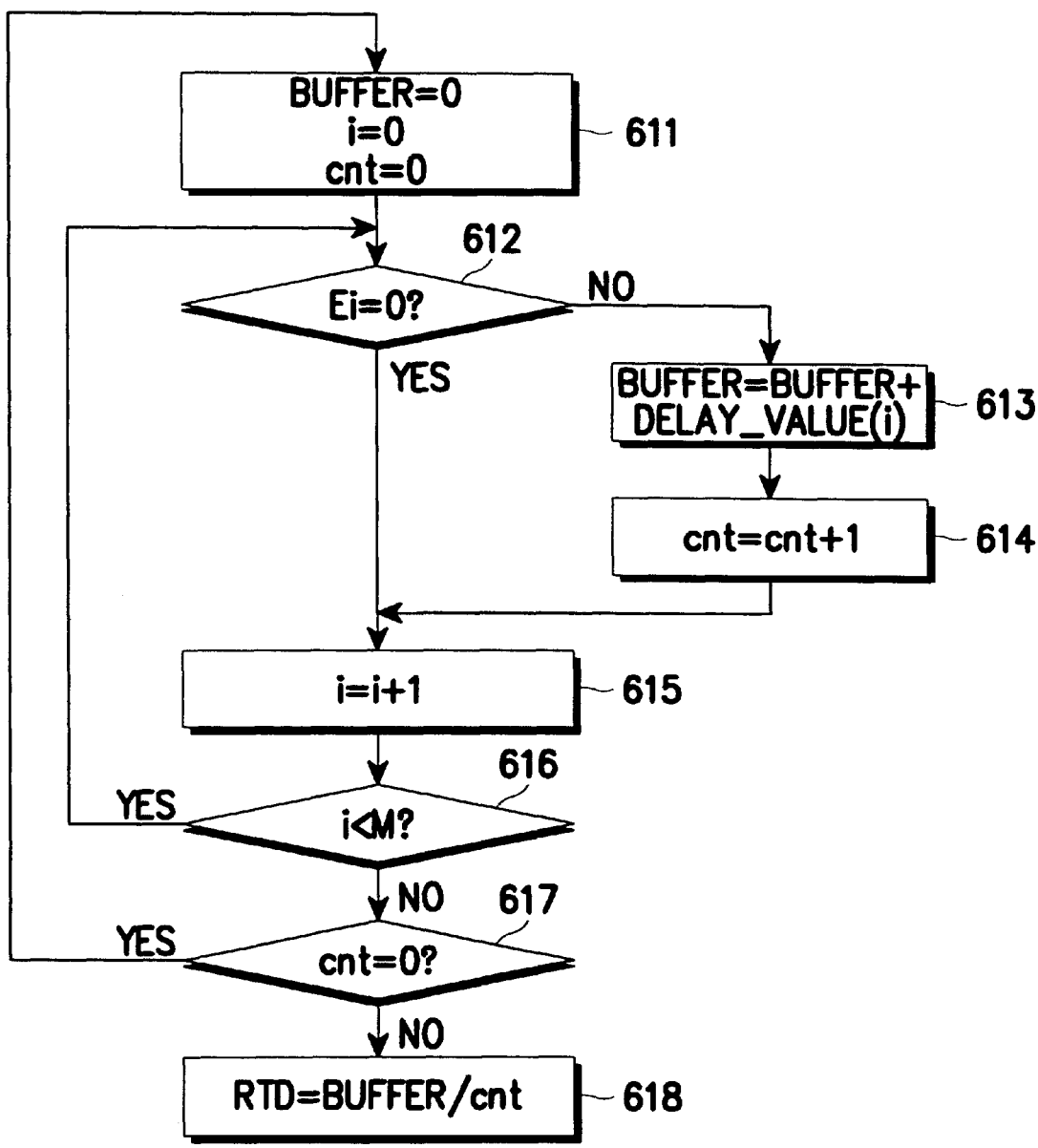
FIGS. 6A, 6B, and 6C are flowcharts illustrating how a sync channel signal round trip delay (RTD) is determined in a position decision block shown in FIG. 5.
Figure 6B:
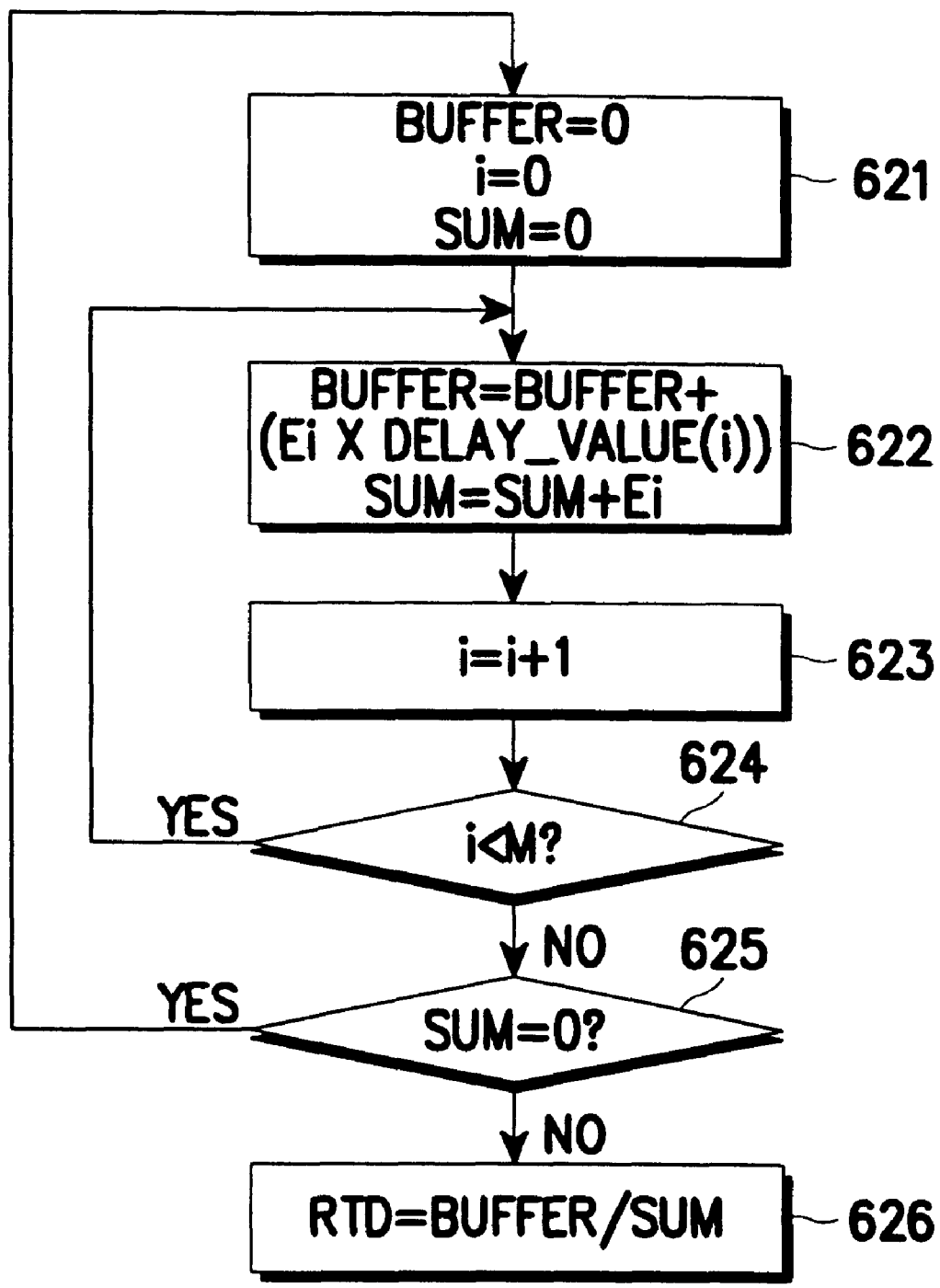
Figure 6C:
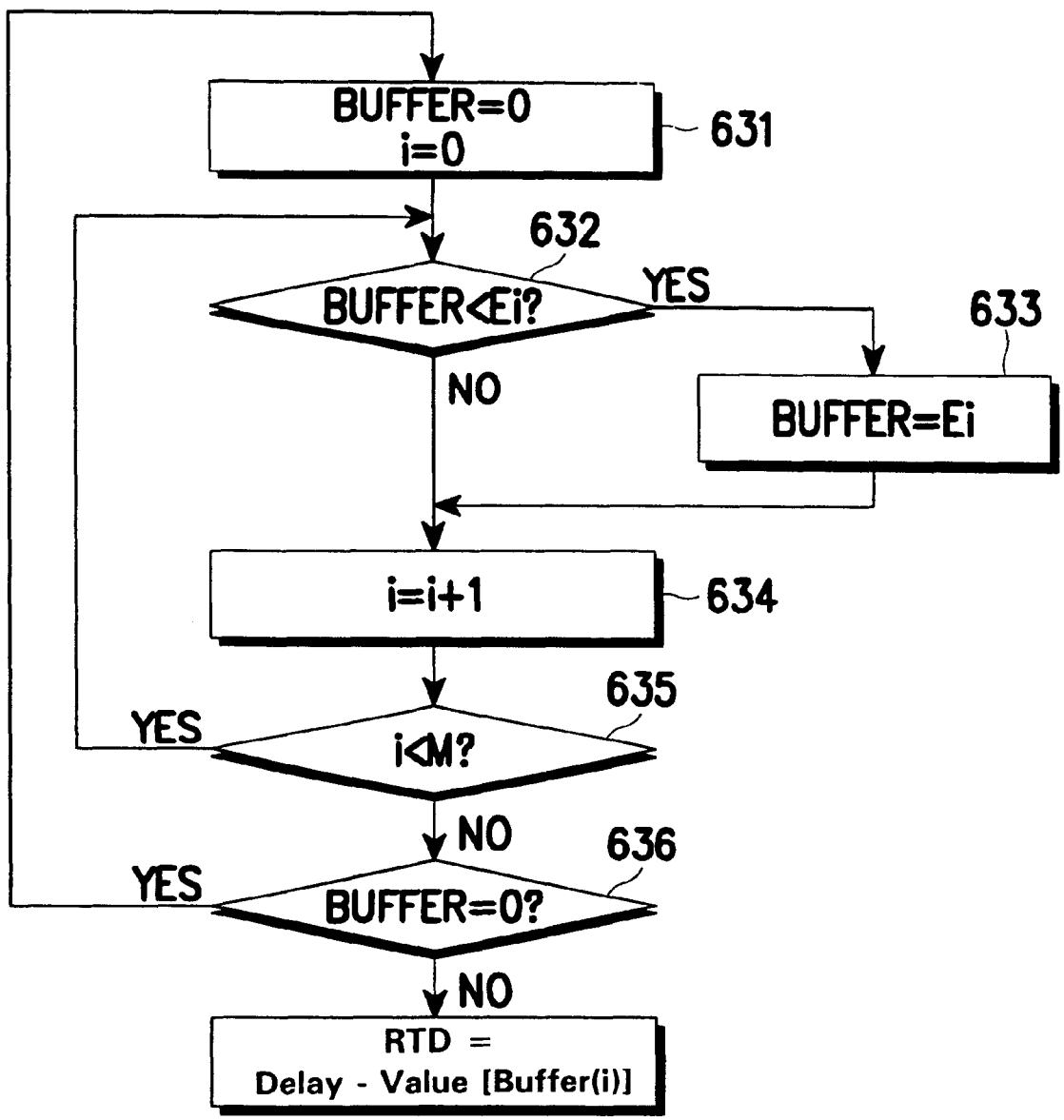

FIGS. 6A, 6B, and 6C, generally depict, in flowchart form, the method for estimating a sync channel RTD indicated in the position decision block 540 of FIG. 5. It is to be appreciated that the base station has a table showing delay values of a sync channel signal received from the sync channel demodulator 316 with respect to outputs of the comparators 531–53M if the outputs are not zeroes.

Referring to FIGS. 5 and 6A, FIG. 6A illustrates the steps to perform a sync channel RTD estimation generally achieved by calculating the average of all non-zero outputs of the comparators 531–53M in the respective branches. In step 611, a buffer, a counter (cnt) for counting the number of non-zero outputs of the M comparators 531–53M, and a load counter i are all initialized to zero. In step 612, it is determined whether the output of an ith branch is zero. If the ith branch output is non-zero, a delay value corresponding to the ith branch output is added to the value stored in the buffer, in step 613. In step 614, the counted value is incremented by one in order to detect the number of non-zero outputs of the respective branches. Otherwise, if the ith branch output is zero in step 612, the load counter is incremented by 1, at step 615. It is then determined whether all branches have been checked in step 616, and if they all have been checked. A determination is made as to whether counter (cnt) is zero in step 617. If the counter value is zero, the procedure returns to step 611 to repeat steps 611–617. Otherwise, if the counter (cnt) is not zero, the value stored in the buffer is divided by the counter value and the result is output as an estimated sync channel RTD, in step 618.

FIG. 6B illustrates a second sync channel RTD estimation method which applies weights to the outputs of the comparators 531–53M. In step 621, the buffer is set to an initial value of zero, and a summing buffer (SUM) for summing the outputs of the M comparators 531–53M is also set to an initial value of zero. In step 622, the output Ei of the comparator in an ith branch is multiplied by a delay value corresponding to the output Ei and the resulting value is added to the value stored in the buffer (BUFFER). Further, the ith branch output Ei is also added to the value stored in the summing buffer (SUM). In step 623, i is incremented by one (i=i+1). It is then, in step 624, determined whether all branches have been checked (i<M), and whether the value stored in the summing buffer, (i.e., the sum of the M comparator outputs) is zero in step 625. If the summing buffer value is zero, the procedure returns to step 621 to repeat steps 621–625. Otherwise, if all branches have been checked and the summing buffer value is not zero, the buffer value is divided by the summing buffer value, to thereby determine the sync channel RTD, in step 626.

FIG. 6C illustrates a third sync channel RTD estimation technique achieved by selecting the largest branch output among the comparator outputs in the branches. In step 631, the buffer is set to an initial value zero and a parameter i is initialized to zero. Then, a first to an Mth branches are checked in steps 632 to 635. In step 632, it is determined whether the output Ei of an ith comparator is larger than the value stored in the buffer. If it is, the value Ei is stored in the buffer in step 633. If it is not, an (i+1)th branch is checked in step 634. It is determined whether all the branches are checked in step 635. Upon completion of checking the branches, it is determined whether the buffer is not updated in step 636. If it is not updated, the procedure returns to step 631 to resume the steps. If the buffer is updated, a delay value corresponding to the value Ei stored in the buffer is determined as the sync channel RTD.

Figure 7A:
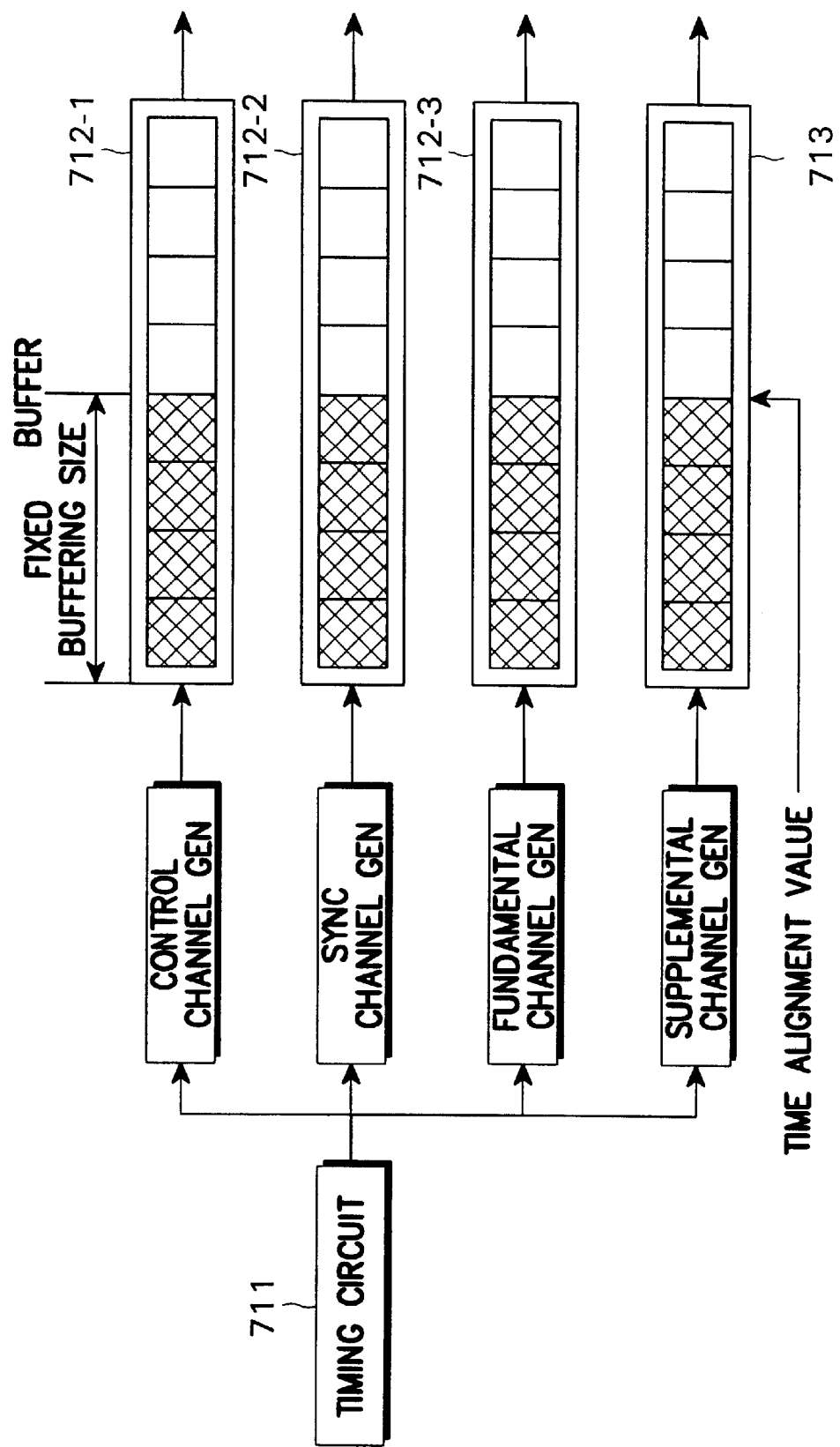
FIGS. 7A and 7B illustrate time alignment of a reverse link transmission in a terminal under the control of a base station.
Figure 7B:
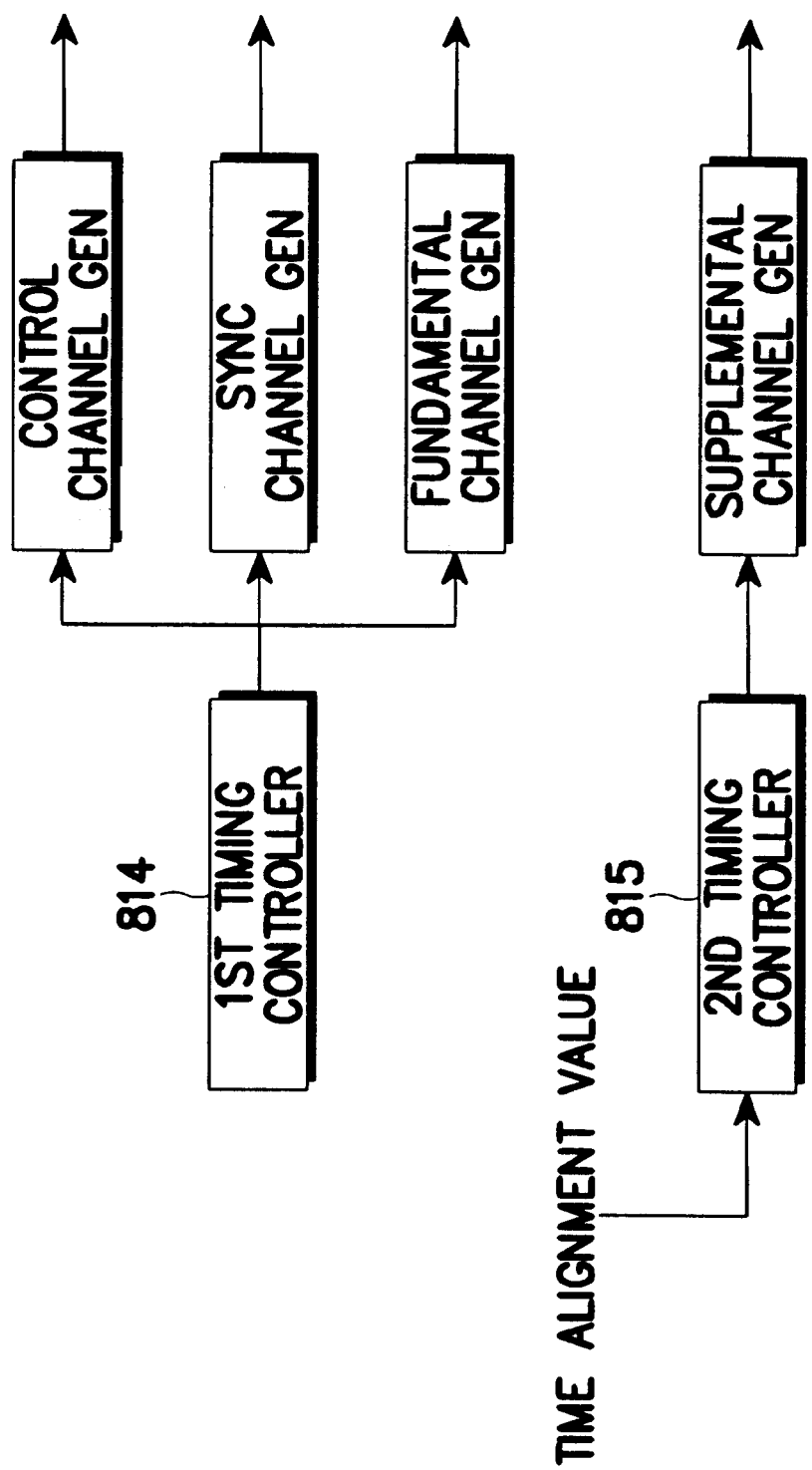

FIGS. 7A and 7B illustrate embodiments of an RTD changing operation in a terminal based on a time alignment parameter and an action time parameter received from a base station.

In FIG. 7A, buffers are provided to all channel generators so as to control a buffering time for transmit data of a channel subject to time alignment on the basis of the time alignment value received from the base station. A timing controller 711 functions to distribute appropriate clock pulses to each channel generator. Buffers 712-1, 712-2, and 712-3 are applied to a control channel, a sync channel, and a fundamental channel, respectively, and have the same fixed buffering size. A buffer 713 for a supplemental channel is set to the same buffering time as the other channel buffers when upon system acquisition, the terminal requests a supplemental channel and is assigned the supplemental channel from the base station. But, upon reception of a time alignment command from the base station, the buffering time for the supplemental channel buffer 813 is adjusted according to the time alignment command. In case a supplemental channel RTD should be reduced due to a variation in channel status during data communication, the buffering time is decreased by a time alignment value. On the other hand, in the case requiring the increase of the supplemental channel RTD, the buffering time is incremented by a received time alignment value.

FIG. 7B illustrates a time alignment control operation with a timing controller separately procured for a channel subject to time alignment. A first timing controller 814 is a general timing controller, for distributing clock pulses to each channel at a predetermined time point. A second timing controller 815 is dedicated to time control of a supplemental channel, for causing the supplemental channel to be transmitted at the same action time as the first timing controller 814 and then at a changed action time based on a time alignment command upon reception of the time alignment command from the base station. For example, the supplemental channel RTD can be decreased by advancing the supplemental channel action time by a time alignment value in the second timing controller 815 and increased by delaying the supplemental channel action time by a time alignment value in the second timing controller 815.

Now returning to FIG. 2, if the sync channel RTD is larger than the reference sync channel RTD stored in the base station as indicated by 212, the delay estimator 325 of the base station obtains the difference between the reference sync channel RTD and the sync channel RTD estimated from the output of the sync channel demodulator 316 and sends the RTD error D-VALUE to the controller 312 of the base station. If D_VALUE exceeds a predetermined value, the controller 312 sends the terminal a time alignment parameter ASS_TIME and an action time parameter ASS_ACTIME generated based on the RTD error D_VALUE on a forward control channel. Then, the controller 311 of the terminal changes a supplemental channel RTD at the designated action time. When the supplemental channel RTD indicated by 212 is advanced by the time alignment parameter, the supplemental channel is time aligned, as indicated by 213, without a change in the sync channel RTD. That is, time alignment of the supplemental channel is accomplished by keeping the sync channel RTD, varied with channel status, intact, and adjusting the difference between the supplemental channel RTD and the sync channel RTD.

Meanwhile, if the sync channel RTD is smaller than the reference sync channel RTD stored in the base station as indicated by 214, the delay estimator 325 of the base station obtains the difference between the reference sync channel RTD and the sync channel RTD estimated from the output of the sync channel demodulator 316 and sends the RTD error D-VALUE to the controller 312 of the base station. If D_VALUE exceeds a predetermined value, the controller 312 sends the terminal a time alignment parameter ASS_TIME and an action time parameter ASS_ACTIME generated based on the RTD error D_VALUE on a forward control channel. Then, the terminal changes a supplemental channel RTD at the designated action time. When the supplemental channel RTD indicated by 214 is delayed by the time alignment parameter, the supplemental channel is time aligned as indicated by 215 without a change in the sync channel RTD.

A CDMA mobile communication system according to the present invention provides a method of time aligning reverse link transmission, in particular, time aligning a specific channel among several channels in current use, to allow an orthogonal code to be used on a reverse link for user identification and, ultimately to improve the performance of the reverse link. Overhead is minimized by time aligning reverse channels using a control message via a DCCH without modifying the structure of an existing CDMA mobile communication system. Though it is preferable to execute a time alignment on all the reverse channels, the challenging issue is the shortage of orthogonal codes if a terminal occupies several channels and there are a lot of such terminals for a single base station. Alternatively, it can be effective to time align a channel which is assigned the highest power among reverse channels.

While the present invention has been described in detail with reference to the specific embodiments, they are mere exemplary applications. Thus, it is to be clearly understood that many variations can be made by anyone skilled in the art within the scope and spirit of the present invention.

What is claimed is:

1. A base station for time alignment on a reverse link in a CDMA communication system comprising:
   a sync channel receiver for receiving a sync channel signal;
   a delay estimator for continuously estimating a sync channel round trip delay (RTD) by calculating an RTD error value as the difference between a measured sync channel RTD and a stored reference sync channel RTD;
   a controller for generating a time alignment control signal whenever the RTD error value exceeds a predetermined value for providing continuous time alignment; and
   a control channel transceiver for transmitting the time alignment control signal to a mobile station.

2. The base station of claim 1, wherein the sync channel is a reverse pilot channel and the control channel is a DCCH (dedicated control channel).

3. The base station of claim 1, further comprising a fundamental channel transceiver for transceiving a voice signal and a supplemental channel transceiver for transceiving packet data.

4. The base station of claim 2, wherein the RTD of the reverse pilot channel is estimated and the estimated RTD is used to generate the time alignment control signal to time align a supplemental channel signal and a fundamental channel signal.

5. A terminal in a CDMA communication system comprising:
   a sync channel generator for generating a sync channel signal;
   a control channel receiver for receiving a time alignment control signal from a base station;
   a controller for aligning the transmit time of traffic data based on the received time alignment control signal; and
   a traffic channel transmitter for transmitting the time aligned traffic data,
   wherein the received time alignment control signal is transmitted from the base station whenever a round trip delay (RTD) error value continuously estimated by the sync channel signal exceeds a predetermined threshold value.

6. The terminal of claim 5, wherein the sync channel is a reverse pilot channel, the traffic channel is a packet data channel, and the control channel is a DCCH.

7. A method for controlling the transmit time of a reverse traffic channel signal in a CDMA communication system, the system including a base station and a terminal, the method comprising the steps of:
   estimating a round trip delay (RTD) of a sync channel signal received from the terminal and calculating an error value calculated as the difference between a measured sync channel RTD of the sync channel and a reference sync channel RTD;
   generating a time alignment control signal whenever the error value continuously estimated by the sync channel signal exceeds a predetermined value to provide continuous time alignment;
   transmitting the time alignment control signal to the terminal; and
   controlling the transmit time of a traffic channel signal based on the time alignment control signal.

8. A code division multiple access communication system comprising:
   a sync channel demodulator for receiving and demodulating a sync channel signal;
   a delay estimator for calculating an RTD error value as the difference between a measured sync channel round trip delay (RTD) and a reference sync channel RTD;
   a controller for receiving the calculated RTD error and generating a time alignment control signal and an action time control signal whenever the calculated RTD error value continuously estimated by the sync channel signal exceeds a predetermined value for providing continuous time alignment; and
   a forward control channel transmitter for transmitting the time alignment control signal, the action time control signal and a call control signal to a terminal.

9. The system of claim 8, wherein the sync channel is a reverse pilot channel.

10. A code division multiple access communication system, comprising:
    a base station having a sync channel demodulator for receiving and demodulating a sync channel signal;
    a delay estimator for calculating an RTD error value as the difference between a measured sync channel round trip delay (RTD) associated with said demodulated sync channel signal RTD and a reference sync channel RTD;
    a base station controller for receiving the calculated RTD error value from the delay estimator and generating a time alignment control signal and an action time control signal whenever the RTD error value continuously estimated by the sync channel signal exceeds a predetermined value for providing continuous time alignment;
    a forward control channel transmitter for transmitting the time alignment control signal and the action time control signal received from the controller;

a terminal having a sync channel generator for generating a sync signal;

a control channel receiver for receiving the time alignment control signal and the action time control signal;

a terminal controller for outputting the time alignment control signal and the action time control signal to a reverse traffic channel upon reception of the time alignment control signal and the action time control signal from the forward control channel transmitter; and a traffic channel transceiver for receiving the time alignment control signal and the action time control signal from the terminal controller and transmitting time aligning traffic data based in said reverse traffic channel on the time alignment control signal and the action time control signal.

11. The system of claim 10, wherein the sync channel is a reverse pilot channel, the traffic channel is a packet data channel, and the control channel is a DCCH.

* * * * *